United States Patent [19]

Holst et al.

[11] Patent Number: 4,845,897

[45] Date of Patent: Jul. 11, 1989

[54] GRINDING MACHINE FOR GRINDING OR RASPING OF RUBBER ITEMS

[75] Inventors: Svend Holst, Tarm; Niels Jensen, Hemmet; Georg Jensen, Skjern, all of Denmark

[73] Assignee: B & J Rocket Rasp A/S, Tarm, Denmark

[21] Appl. No.: 140,821

[22] Filed: Jan. 5, 1988

[30] Foreign Application Priority Data

Jan. 5, 1987 [EP] European Pat. Off. ........ 87.850001.6

[51] Int. Cl.[4] .............................................. B24B 7/00
[52] U.S. Cl. .......................................... 51/78; 51/110; 51/141; 51/215 E
[58] Field of Search ............. 51/78, 141, 174 R, 76 R, 51/215 E, 215 R, 215 M, 38, 61, 138, 135 R, 110

[56] References Cited

U.S. PATENT DOCUMENTS

| | | |
|---|---|---|
| 1,521,582 | 12/1924 | Stevens . |
| 2,199,135 | 4/1940 | Johnston . |
| 2,284,557 | 5/1942 | Brackett . |
| 2,441,108 | 5/1948 | Turner . |
| 3,167,889 | 2/1965 | Jacobi . |
| 3,648,415 | 3/1972 | Bair . |
| 3,943,806 | 3/1976 | Kuts . |
| 4,258,506 | 3/1981 | Robinson . |
| 4,416,090 | 11/1983 | Jonasson . |
| 4,679,354 | 7/1987 | Holst et al. . |
| 4,719,721 | 1/1988 | Stump .................. 51/138 |

FOREIGN PATENT DOCUMENTS 1172844 7/1964 Fed. Rep. of Germany .

Primary Examiner—Frederick R. Schmidt
Assistant Examiner—Maurina Rachuba
Attorney, Agent, or Firm—Merchant, Gould, Smith, Edell, Welter & Schmidt

[57] ABSTRACT

A grinding machine for grinding or rasping of the back of tread rubber (20 for retreading rubber tires comprises a conveyor belt (1) carrying the rubber item (2) in under a grinding roller (3) assisted by one-sidedly rotating rollers (4,5). Under the grinding roller (3) the conveyor belt is supported by a table (14) resting on a bellows cylinder (13), said table (14) carrying support means comprising blocks (30) resting on a hose (28) under pressure. On the convex top side (38) of each block rests a fish-plate (32), the top side (34) of which supports the conveyor belt (1) immediately under the grinding roller (3). The fish-plates (32) may individually adapt themselves to the shape of the rubber item (2) during the grinding process.

7 Claims, 4 Drawing Sheets

GRINDING MACHINE FOR GRINDING OR RASPING OF RUBBER ITEMS

The invention relates to a grinding machine for grinding or rasping of rubber items, and of the type described.

Rubber is one of the most difficult materials to grind or rasp, the reason being that the material's elastic and yielding characteristics make it difficult to grind accurately. Either too much or too little is ground off and the grinding process will often have to be repeated. Therefore, to a wide extent, the grinding of rubber is avoided.

There are, however, certain technical areas in which grinding or rasping of rubber items cannot be avoided. For example, rubber which is to be glued or vulcanised to another item must have both a clean and a rough surface to which the glue or the vulcanising medium or the like binder can get a grip. In the retreading of rubber tires for vehicles, the tire which is to be provided with a new tread is first rasped and cleaned after which a suitable piece of rubber with a new tread is applied, for example by means of an adhesive mass which is heat-treated so that the items can be vulcanised together. The cleaning and preparation of the back of the rubber item with the new tread is a difficult operation which demands a great deal of care, the reason being that the quality of this preparation is the whole basis for whether or not a sufficiently good retreading is achieved.

Rubber items with tread patterns are delivered in long lengths of 3-15 m from which suitable pieces are cut. The rubber items are moulded using a special moulding process, and in order to ensure that the items come free of the mould, various kinds of slip media must be used. The back of the rubber item, ie. the side which is to be vulcanised to the prepared tyre, may be quite smooth, partly due to the method of moulding and partly due to the slip medium. Such a surface cannot be used directly, neither for gluing nor vulcanising. The surface has to be cleaned and made rough, for example by grinding or rasping.

In carrying out this grinding or rasping, two requirements must be taken into consideration. Firstly, the whole surface has to be ground clean, which is difficult because it is not necessarily completely flat. Secondly, too much material must not be removed but only a quite thin layer, which is even more difficult because the precured rubber items do not have a completely even and uniform thickness. The known machines on the market, which are at present used for the preparation of rubber items of said kind, work almost as a type of planing and thicknessing machine. They remove too much material in order to be quite sure that the requirement regarding sufficient clean grinding is fulfilled.

A machine is known from German publication No. 1,172,844 for grinding or rasping non-vulcanised rubber items for new tires for vehicles, said rubber items having to be mounted on and vulcanised on to ready built-up carcases, whereby new tires for vehicles are produced. The machine is specially adapted to grind clean the back of non-vulcanised rubber items with very great variations in thickness along the item's breadth, because the items comprise both the quite thick tread part and the many times thinner tire sides. For this purpose the apparatus has a rotating wire brush cylinder and yielding counter-holds consisting of a series of disks which can yield individually so that they adjust themselves to the thickness of the item. In order to achieve a uniform rasping, it has thus been necessary to use a complicated counter-holder construction. This gives rise to problems with the start and finish of the rasping of the item, the reason being that the item is not precisely supported or there is no precise feeding and feed rate of the item.

From Danish Pat. No. 149,327 there is known a grinding machine of the type described whereby in connection with many types of tread items it is possible to achieve sufficient cleaning of the back of the tread item without removing too much material. Problems have occurred, however, in connection with grinding or rasping of rubber items with very deep grooves or gaps in the pattern, for example rubber items for winter tires, tires for contractors' machinery and similar tires with coarse patterns. Such tread patterns consist of thick tread parts connected at the bottom of the grooves or gaps by relatively thin rubber areas. When grinding or rasping on the back of such rubber items, it is difficult to avoid uneven rasping since the thick rubber areas even by small dissimilarities in the counterpressure from the support surface under the conveyor belt may be offset or bent sideways so that the relatively thin rubber areas are deformed and thus irregularly machined.

The object of the invention is to provide a grinding machine of the kind described, whereby there is always achieved a correct and over the entire breadth uniform counterpressure from the supporting surface so that a perfect machining can be achieved on any form of rubber tread item.

This is achieved by designing the grinding machine according to the invention as disclosed. On top of the yielding support plate there are arranged further means for adjustment of the support so that the support plate can not only tilt in any direction and adjust itself to the shape of the rubber item but also direct under the grinding means an adjustment takes place, ie. simultaneously with the grinding process the support plate adjusts itself to the cross-sectional profile of the rubber item accurately on the place of grinding. Due to the improved adjustment it is possible to work with a smaller contact pressure against the grinding means without the item sliding on the conveyor belt.

By designing the grinding machine according to the invention as disclosed there is achieved an adjustment of the support and thus the counterpressure over the entire breadth of the rubber item.

By designing the grinding machine according to the invention as disclosed there is obtained an evenly distributed support where the individual support means together constitute a surface over which the conveyor belt may slide without problems.

By designing the grinding machine according to the invention as disclosed there is obtained a simple structure so that the flexible base can be produced without the need for using complicated mechanisms and the like.

By designing the grinding machine according to the invention as disclosed, there are obtained cooperating flexible means thereby obtaining optimal adjustment of the support for the rubber item. Should any irregularity on the rubber item press down one or more of the support blocks, the pressure will increase in the chamber and the other support blocks will be lifted a little so that there is automatically obtained an adjustment of the pressure of the support on the rubber item thereby obtaining an optimal machining without removing to much material from the item.

By designing the grinding machine according to the invention as disclosed, it is possible to adjust the pressure in the flexible chamber and thereby the support pressure against the rubber item. It will thus be possible to adjust the grinding machine according to the invention to any type of rubber whether soft or hard.

By designing the grinding machine according to the invention as disclosed, it is possible to limit the individual movements of the support means in that same are intended for ensuring a fine adjustment and accurate distribution of the counterpressure of the support surface whereas the means, for example a centrally arranged pressure air bellows cylinder, trying to press the entire freely movable support table against the grinding means, provides coarse adjustment of the counterpressure and adjustment of the position of the table to the shape of the item.

By designing the grinding machine according to the invention as disclosed, there is obtained improved grinding or rasping because the distance between the grinding means and the support is only slightly reduced over the entire breadth of the conveyor belt. This also results in a good start and a good finish of the grinding on the rubber items.

By designing the grinding machine according to the invention as disclosed, it is possible for the fish-plates to move more freely during the grinding process and thus adjust themselves to irregularities in the rubber item.

SUMMARY OF THE DRAWINGS

The invention will now be described in more detail with reference to the drawing, which shows a preferred embodiment of the invention, where.

DETAILED DESCRIPTION

Figure 1:
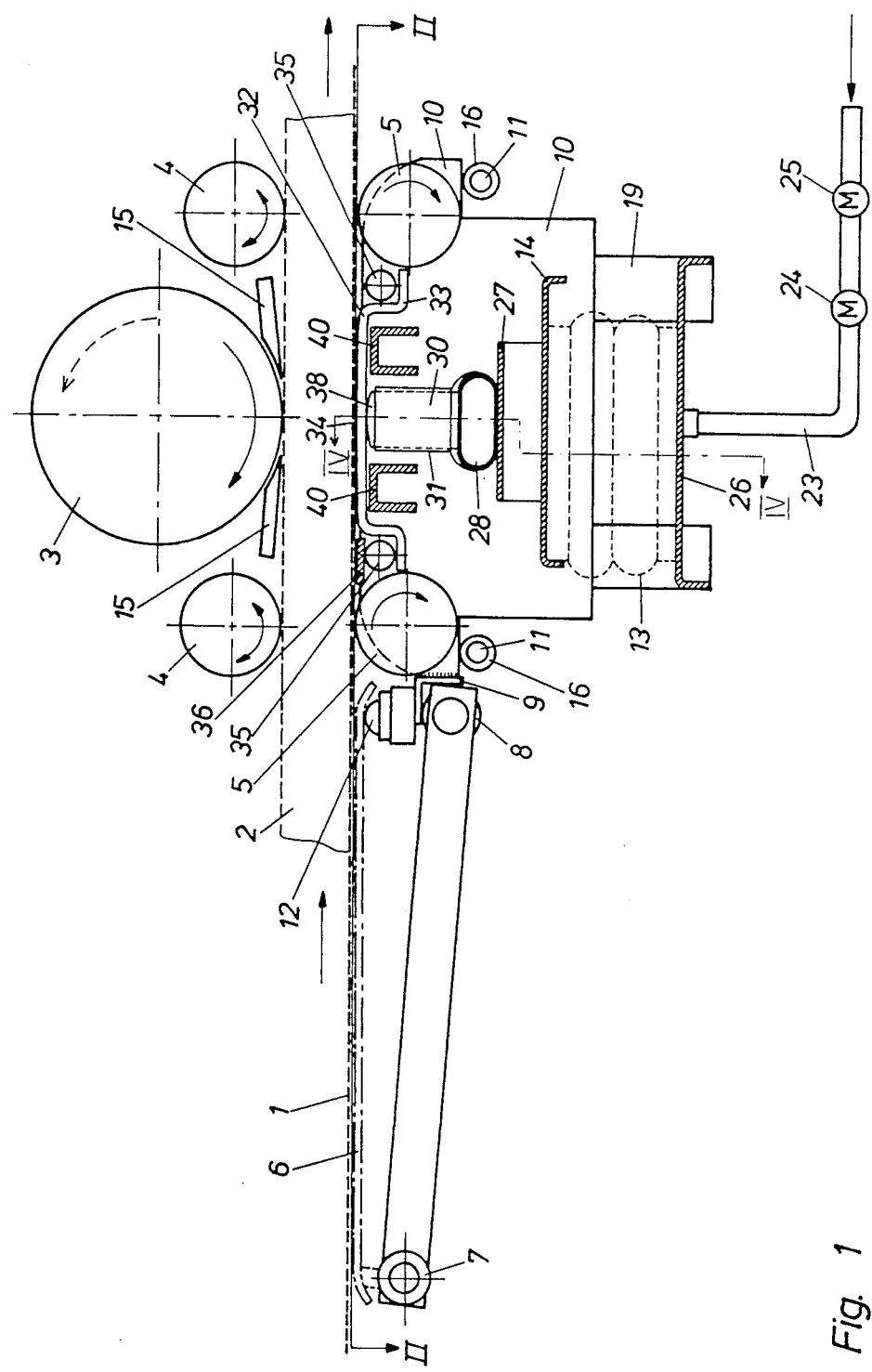
FIG. 1 shows a principle drawing of the grinding machine in the form of a longitudinal section therein.

In the drawing 3 indicates a grinding wheel, a grinding cylinder or a grinding roller, if convenient, in the form of an iron cylinder with low carbon content and having copper-soldered tungsten grain or other abrasive grit on the surface. The grinding roller 3 rotates in the direction shown by the arrow when making reverse grinding. It is also possible to make forwards grinding when the roller 3 rotates in the direction shown by the broken line arrow. A rubber item 2, for example an oblong piece of tread rubber with the tread pattern facing downwards, is fed in under the grinding roller. The item 2 is conveyed on a motor-driven conveyor belt 1, which moves in the direction shown by arrows. For the feeding and counter-holding of the rubber item, two free-running guide rollers or cylinders 4 are mounted above the item, and two rollers 5, which support the conveyor belt, are mounted under the conveyor belt.

In order to ensure that the grinding ruller 3 does not grind or machine the item 2 until it is correctly in place under the grinding roller, one or more guide rails 15 are mounted, these having a transverse extension which is at least the same size as the grinding roller, and which as shown in FIG. 1 of the drawing are knifelike associated with the roller 3. Under the conveyor belt 1 there is disposed a plate 14 carrying support means 30, 32 on which the conveyor belt 1 slides. The plate 14 is supported in a substantially central manner by a bellows cylinder 13 resting on a part 26 of the machine chassis said bellows cylinder being supplied with compressed air via a pipe 23. The air pressure is regulated for example via two pressure-regulating means with manometers 24 and 25 for fine regulation and coarse regulation, respectively, of the pressure in the bellows cylinder 13.

Figure 2:
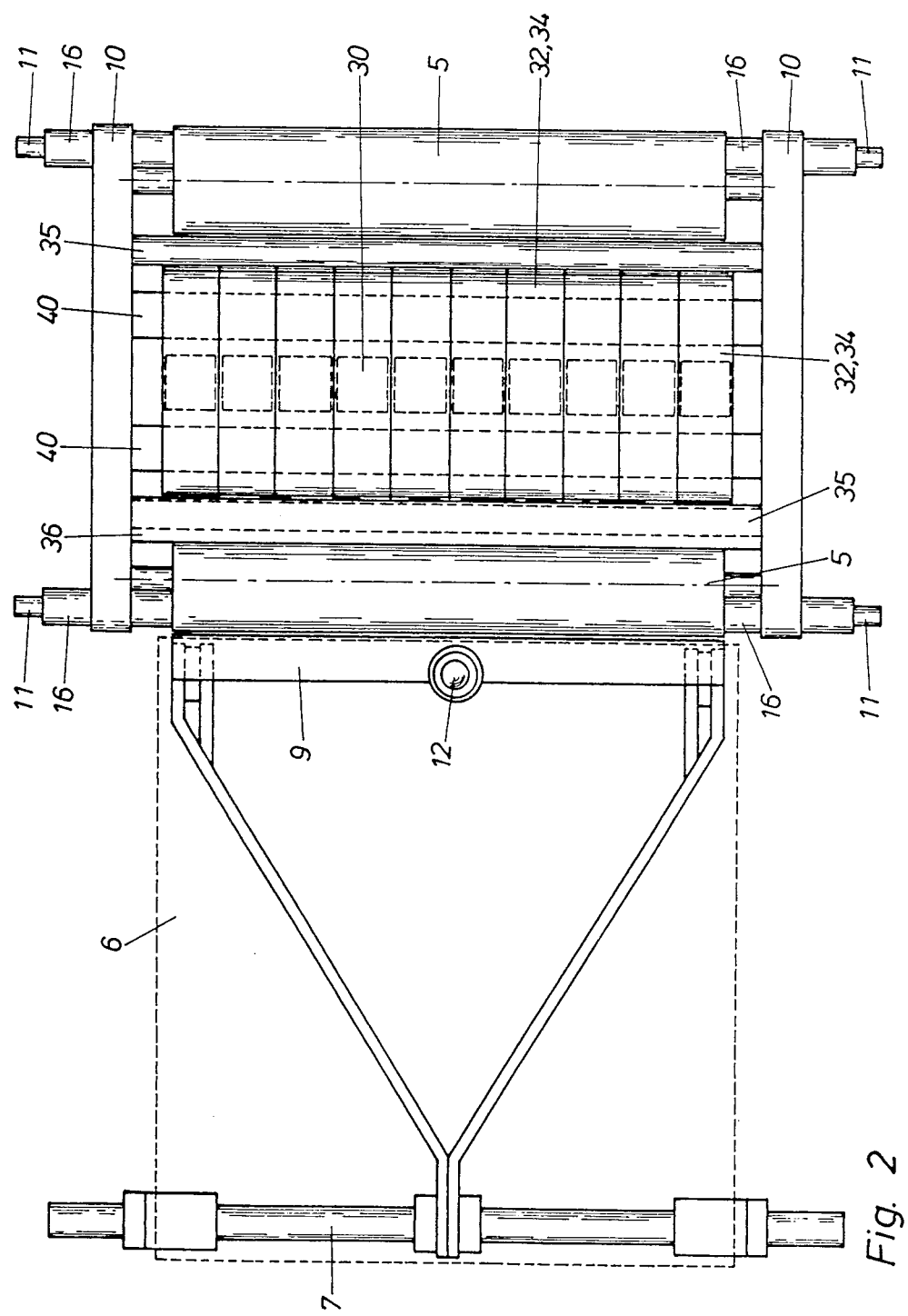
FIG. 2 shows a part of the same machine as shown in FIG. 1, but seen from above in the direction II—II.
Figure 3:
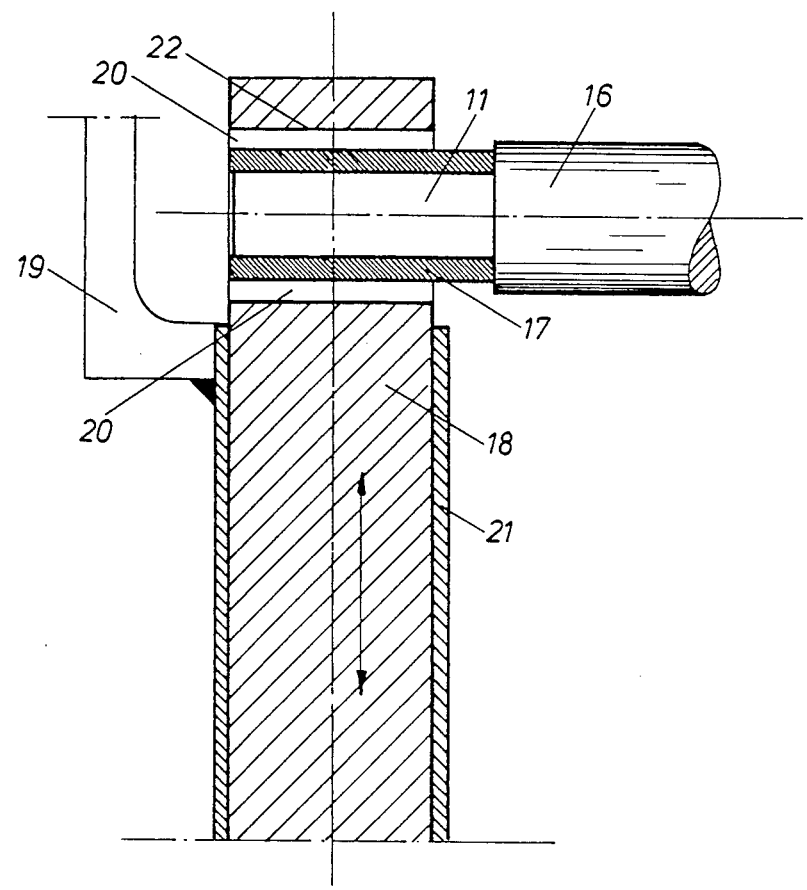
FIG. 3 shows a detail relating to the adjustment and suspension means for the support of the conveyor belt.
Figure 4:
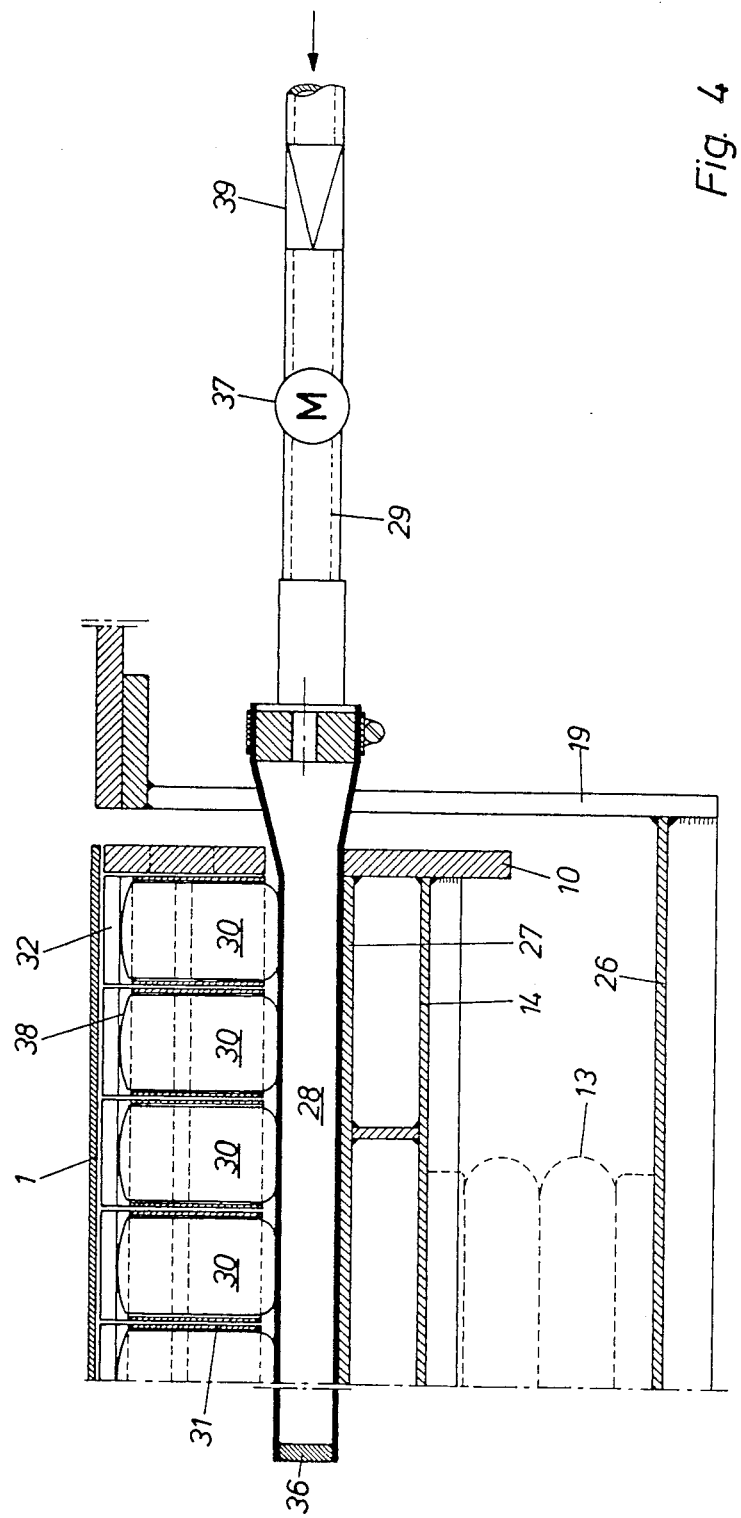
FIG. 4 shows a vertical section of FIG. 1 seen in the direction IV—IV.

The support surface 34, which is seen in both FIGS. 1 and 2, is mounted on a machine part 10 which is secured to transverse bearing arms or axles 16. The bearing arms or axles 16 are terminated at each end by axle journals 11. In FIG. 3 it will be seen in more detail how each of the four axle journals 11 is suspended in an adjustable machine part 18, which constitutes an adjustable support holder. The holder 18 can be displaced in vertical direction as shown by the double arrow, for example in a sleeve 21 or the like. The sleeve 21 is secured to the actual machine chassis 19. The holders 18 can be displaced and be arranged in different ways, for example so that it comprises a part of a thread spindle, or similar spindle, which is displaced by the turning of underlying not shown nuts, gear-wheels or other not shown means. The grinding machine is constructed in such a way that all four support means 18 are adjusted at the same time and by an equal amount. By raising or lowering the support means 18, the support surface 34 is raised or lowered. Each of the axle journals 11 are engaged with a bush 22, but in such a way that there is a certain area of tolerance 20 between the axle journal 11 and the limiting wall of the bush. A part of this area 20 can be filled out with a rubber or plastic bush 17 on the axle journal 11, or by a rubber or plastic bush placed in the bush 22. However, the axle journal has a certain freedom of movement, in that it is free to move in the area 20, the size of which is in the order of several millimetres (see the following explanation of the machine's function).

If the machine is without rubber item 2, ie. in idling condition, the plate 14 will be pressed upwards by the bellows cylinder 13 just as much as allowed by the area of tolerance 20. On top of the plate 14 there is arranged a support means 27 with a plane surface on which a hose, for example a rubber hose 28 is resting. The hose 28 is at one end closed by an air-tight plug 36 and at the other end connected to an air-pressure pipe 29 with manometer 37 and pressure regulating valve 39 so that the pressure in the hose 28 can be adjusted at a desired value and be constantly held at this value.

Directly on top of the hose 28 rest a number of square, solid PVC-blocks 30 which in vertical direction are freely movable in continuous square tubes 31 arranged in parallel. On top of the covex topside 38 of the PVC-blocks rest metal fish-plates 32, the surfaces 34 of which are slightly convex so that they are highest in the centre, constitute the support surface of the conveyor belt 1, and thereby provide direct support of the item to be machined.

The fish-plates 32 have double-bent end U-shaped parts 33, for example by two bends turning substantially 90° to each other. The possibilities of movement of the fish-plates in vertical and horizontal direction are limited by transverse support beams 40 and axles 35 which will only allow the fish-plates to move a few millimeters, for example 3 mm in vertical direction and also a few millimeters, for example 2-4 mm in horizontal direction, but in such a manner that the fish-plates 32 will nevertheless be capable of freely adapting themselves to the shape of the rubber item 2.

For further supporting the conveyor belt 1 at the side where the rubber item 2 is carried in under the grinding means, the support axle 35 may be provided with a plate 36 so that the conveyor belt 1 will not be forced down into the gap.

In order that the entire machine part 10 will tilt so that the support surface 32 may adjust itself to the rubber 2 already before this reaches in under the grinding wheel 3, a guide plate 6 can be disposed under the conveyor belt in front of the support surface. The guide plate can be hinged on a spindle 7, said spindle being secured in a manner not shown to the chassis of the machine. From the spindle 7, an arm or a beam can extend to a pivot joint 8, which via an angle piece 9 is fastened to the machine part 10. On the angle piece 9 can be mounted a support ball or hemisphere of metal 12, upon which rests the guide plate 6. When the guide plate 6 is pressed slightly downwards by the weight of rubber item, this can make the support surface tilt slightly, the result being that its left-hand side in FIG. 1 is lowered a little so that the rubber item is more easily fed in under the grinding wheel 3 by the conveyor belt 1.

The grinding wheel or roller 3 is, for example, up to 500 mm in breadth so that even the broadest rubber items for the retreading of rubber tyres can be machined. Rubber items of this type have a thickness of 10–35 mm and a breadth of 150–500 mm. With the machine according to the invention it is possible to grind a rubber item clean generally in one operation. It is possible, however, to arrange several grinding machines according to the invention after one another on the same conveyor belt, thus enabling, for example, both coarse grinding and fine grinding at the same time, or both continuous and reverse grinding. The pressure in the bellows cylinder 13 must be in the region of 1.5–2.0 bar and the pressure in the hose 28 must be in the region of 0.4–0.8 bar. The area of tolerance 20 is preferably in the order of 2–4 mm on each side of the axle journal 11, and the area of tolerance of the support surface, ie. the fish-plates 32, is preferably in the order of 1–4 mm.

The embodiment shown in FIG. 1 can in fact also be turned over so that support surface 32, 34 will be uppermost and the grinding aggregate 3 at the bottom. The desired result is still achieved in that the rubber item 2 is now fed in with the tread pattern facing upwards. The support surface 32 with guide plate 6 will still adjust the pressure of the rubber item against the grinding aggregate independently of the thickness etc. of the item 2. It is also obvious to a person skilled in the art that the grinding machine according to the invention functions as intended with all forms of grinding aggregates whether grinding rollers, grinding belts, grinding disks on spindles etc.

We claim:

1. A grinding machine for surface roughening of a rubber piece comprising:
    grinding means,
    support means, being freely moveable between predetermined limits, and for holding the workpiece, including:
        a plurality of oblong fish-plates for supporting the workpiece, said plates having bent end portions,
        axle means loosely engaging said bent end portions of said plates to maintain said support means within said predetermined minimum and maximum limits,
        a plurality of individual, adjacent blocks having a convex top, said top being in abutment with one of said plates, said blocks being aligned in a row extending generally orthogonally to the travel of the workpiece through the machine,
        a yieldable base under said blocks for resiliently urging said blocks against said plates.

2. A machine according to claim 1 including a pair of fixed transverse support beams generally parallel to and on both sides of said row of blocks, and each being between said row of blocks and an axle, said beams engaging said fish-plates at said minimum predetermined limit.

3. A machine according to claim 2 wherein said axle means includes a pair of fixed axles and wherein said bent end portions include an L-shaped portion extending under said axles at both ends of the plates.

4. A machine according to claim 1 wherein said yieldable base includes a pressure controlled hollow chamber.

5. A machine according to claim 4 wherein said chamber includes a hose with one closed end and the other end attached to means for controlling the pressure therein.

6. A machine according to claim 1 wherein said fish-plates are convex with respect to their abutment with the workpiece.

7. A machine according to claim 1 including a plurality of square tubes, and wherein said blocks are each slideably disposed within a tube.

* * * * *